April 21, 1953  T. O. SUMMERS, JR  2,635,836
GYRO-CONTROLLED SERVOMOTOR
Filed Oct. 13, 1947  4 Sheets-Sheet 1

INVENTOR.
Thomas O. Summers, Jr.
BY Stuart M. Maule
ATTORNEY.

April 21, 1953    T. O. SUMMERS, JR    2,635,836
GYRO-CONTROLLED SERVOMOTOR
Filed Oct. 13, 1947    4 Sheets-Sheet 3

INVENTOR.
Thomas O. Summers, Jr.
BY
Stuart M. Maule
ATTORNEY.

April 21, 1953

T. O. SUMMERS, JR 2,635,836

GYRO-CONTROLLED SERVOMOTOR

Filed Oct. 13, 1947

INVENTOR.
Thomas O. Summers, Jr.
BY
Stuart M. Marle
ATTORNEY.

Patented Apr. 21, 1953

2,635,836

UNITED STATES PATENT OFFICE 2,635,836

GYRO-CONTROLLED SERVOMOTOR

Thomas Osmond Summers, Jr., Los Angeles, Calif.

Application October 13, 1947, Serial No. 779,626

34 Claims. (Cl. 244—79)

This invention relates to machine elements and mechanisms, and more particularly to gyroscopes.

An object of my present invention is to provide a servomotor capable of delivering energy to a mechanism in a manner causing that mechanism to perform useful work, and, in cooperative association therewith, a gyroscopic control which not only regulates the servomotor, i. e., determines when and to what extent the mechanism served by the servomotor shall operate, but which also serves as a source of the energy required by that mechanism in performing its useful work.

Another object of the present invention is to provide a control surface actuator servo to retard or damp angular movements of the aircraft on which it is mounted by exerting a force against the surface it controls proportional to the rate of angular movement of the aircraft, which force is opposed by the aerodynamic spring resistance developed against the surface as a result of forward speed. Further, the present invention seeks to provide a damper servo for aircraft, capable of applying damping moments thereon which are independent of air speed and altitude.

A more detailed object of this invention is to provide an automatic navigational instrument capable of guiding a moving craft substantially so as to maintain a predetermined path through space, which instrument while not being limited in its applicability to the field of aviation, is particularly adapted for use in connection with modern, ultra high speed airborne craft and missiles because of its extreme sensitivity and substantially immediate response to any deviation from prescribed course experienced by the craft upon which the instrument is borne, and also because of the large quantity of instantly available kinetic energy, in proportion to its size and weight, which the instrument is capable of supplying to a working mechanism.

In still further detail, the present invention seeks to provide a control system for high speed aircraft which achieves stabilization through the expedient of a gyroscope so mounted upon the craft that it is sensitive to angular movement of the craft, and which is capable of limiting any such angular movement by means of a control surface movable by kinetic energy derived from the rotor of the same gyroscope, thus avoiding the necessity of providing a separate flywheel or other independent source of kinetic energy for the performance of desired work.

A still further object of my invention is an auxiliary control feature whereby an instrumentality apart from and operable independent of the gyroscopic control can be employed to apply force derived from the gyro rotor to the craft's control mechanism.

Yet another object is to provide a gyroscopic control achieving stabilization of the general character indicated wherein a variable power output transmission means, for example a multiple disc slip friction clutching mechanism is employed for releasably inter-engaging a source of energy and a power output and wherein this mechanism is actuated by direct mechanical interconnection between the rotor-bearing casing and the clutch mechanism whereby precession of the rotor-bearing casing is limited by the clutch mechanism. In this connection, it might be explained at this point that importance attaches to this detail of the invention for the reason that although the gyroscope is fully sensitive to angular movement about a certain axis, it precludes precession of the gyroscope far enough to make it sensitive to angular movements about other axes. Illustrative of this is the fact that a stabilizing instrument constructed and mounted upon a craft in accordance with the principles of the present invention might be capable of stabilizing the craft against pitching only, and by limiting the gyroscopic element of the apparatus so that it cannot precess more than a predetermined minimum, the instrument is prevented from becoming appreciably sensitive to yawing and rolling of the craft.

Yet another object of the invention is to provide a combined mechanism for performing useful work and for controlling and regulating the work performed thereby to the extent of determining when and to what extent energy shall be supplied to the mechanism's output device, as hereinabove indicated, which mechanism is of remarkably small size and light weight and is characterized by extreme sensitivity and substantially immediate responsiveness and, accordingly, is particularly adapted for use in connection with relatively small high speed aircraft, and which, nevertheless, is highly dependable and sufficiently rugged to withstand the severe condition of operations apt to be encountered.

For the purposes of the present disclosure, the terms "craft" and "aircraft" are interpreted as including all types of missiles and land vehicles, in addition to the ordinary connotations associated with the words.

The invention possesses other objects and features of advantage, some of which, with the foregoing, will be set forth in the following description of the preferred forms of my invention which are illustrated in the drawings accompanying and forming part of the specification. It is to be understood that I do not limit myself to the showing made by the said drawings and description, as I may adopt variations of the preferred forms within the scope of my invention as set forth in the claims.

Referring to the drawings.

Figure 3:
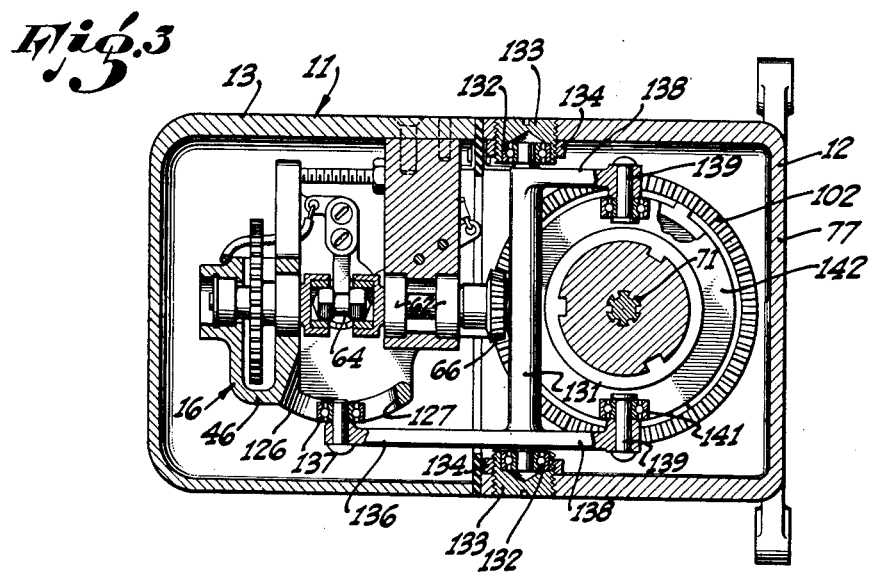
Figure 3 is a sectional view taken upon the line 3—3 of Figure 1, with the direction of view as indicated.
Figure 8:
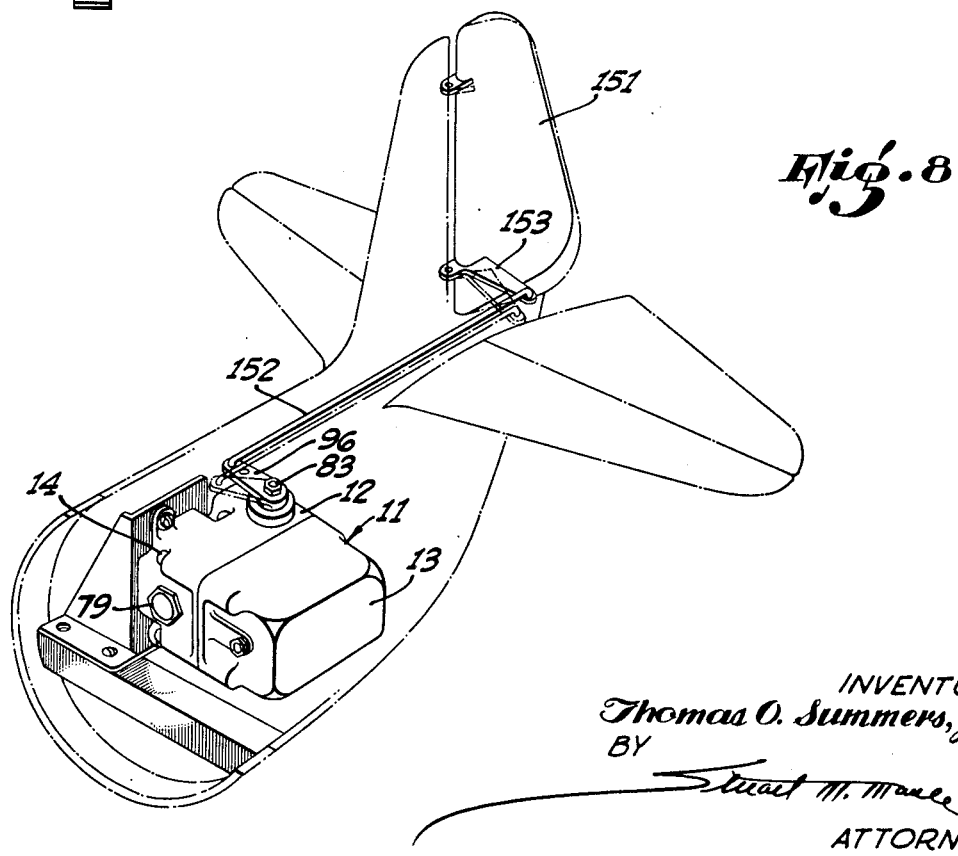
Figure 8 is a diagrammatic view illustrative of a manner in which the servomotor of the present invention is mounted upon the craft which it is to stabilize, and the manner connecting the servomotor to the craft's control mechanism.

Specifically describing that embodiment of my invention which has been chosen for illustration and description herein, my improved servomotor is enclosed within a housing indicated in its entirety at 11, and comprises preferably a base portion 12 and a top portion 13 removably secured thereto as a plurality of cap screws 14 (see Figures 3 and 8). Mounted within the cap portion 13 and for rotary movement about an axis extending longitudinally thereof is the rotor-bearing casing 16 of a gyroscope indicated in its entirety at 17. Preferably the mounting for the casing 16 comprises a pair of opposed axially aligned trunnions 18 threaded through opposite end walls of the housing's top portion 13 and removably anchored in selected position of axial adjustment as by lock nuts 19 threaded upon parts of the trunnions 18 projecting outwardly from the housing. Anti-friction bearings 21 support the ends of the rotor-bearing casing 16 upon the inner ends of the trunnions 18.

The rotor 26 of the gyroscope 17 is supported at one end by a shaft 27, the axis of which intersects the axis of rotary movement of the rotor-bearing casing 16; and this shaft 27 is journalled by means of an anti-friction bearing 28. Rigid with the shaft 27 is a cylindrical shell 31 preferably composed of suitable material having a relatively high specific gravity, an ideal material for such purposes being sintered tungsten.

Inasmuch as the modification presently being described is to be electrically driven, the winding 32 of a permanent magnet, D. C. motor, is fitted within the shell 31. This winding 32 serves as the armature operating within the field of a permanent magnet 33 which surrounds the shaft 27 but remains stationary while the shaft revolves since it is supported by a stationary shaft 34 disposed in co-axial alignment with the rotor shaft 27. This stationary shaft 34 also supports a second anti-friction bearing 36 upon which the other end of the gyro rotor 26 is supported.

A spur gear 41 is provided at the outer end of the shaft 27 which, as explained hereinabove, is rigid with the rotor 26 and consequently partakes of its rotation. Emmeshed with the spur gear 41 is a relatively large gear 42, the shaft 43 of which is suitably mounted in anti-friction bearings 44 carried by an extension 46 of the rotor-bearing casing 16. The shaft 43 also is provided with a relatively small spur gear 47 which emmeshes a large driven gear 48, also carried by a shaft 49 revolubly supported by anti-friction bearings 51 and 52, respectively; one of which is carried by the extension 46 and the other is carried by a web 53 which also constitutes a portion of the rotor-bearing casing. This shaft 49 is parallel to the shaft 27 of the rotor 26. A socket 54 is provided on the inner end of the shaft 49 and the parts are so proportioned and arranged that this socket 54 is spaced only slightly to one side of the axis of rotary movement of the rotor-bearing casing, i. e., the axis of the trunnions 18.

Disposed substantially in alignment with the shaft 49 but on the opposite side of the axis of the trunnions 18 is another shaft 61 which is revolubly mounted within anti-friction bearings 62 carried by a pedestal 63 rigid with the top portion 13 of the housing 11. Consequently, the shaft 61 does not partake of the movements of the rotor-bearing casing 26, and since the shaft 61 is to be driven by the shaft 49, a universal coupling 64 is employed to interconnect these shafts 49 and 63.

Thus it may be seen that the shaft 63 and a driving gear 66 which is rigid with its outer end are rotated continuously by energy derived from the kinetic energy of the rotor 26 of the gyro 17 regardless of the position which the rotor-bearing casing 16 may occupy with respect to its rotational movement about the axis of the trunnions 18.

Within the base portion 12 of the housing 11, a clutch shaft 71 is revolubly mounted in aligned anti-friction bearings 72 and 73 mounted respectively in an end wall 74 of the base portion 12 and in a pedestal 76 upstanding from the bottom wall 77 of the base portion 12. In order to achieve axial adjustment of the shaft 71, the bearing 72 is carried by a stud 78 threaded through the end wall 74 and provided with a lock nut 79 accessible exteriorly of the housing 11.

Figure 4:
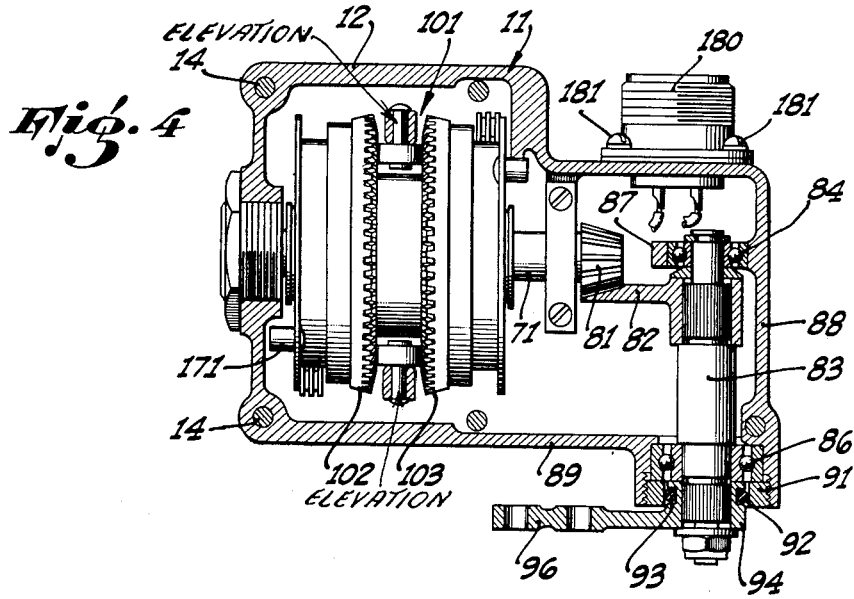
Figure 4 is an irregular sectional view taken upon the line 4—4 of Figure 1, with the direction of view as indicated.

The inner end of the clutch shaft 71 carries a bevel bear 81 enmeshed with a sector gear 82 which in turn is carried by a shaft 83 extending perpendicularly with respect to the shaft 71 and journalled with anti-friction bearings 84 and 86. The bearing 84 is carried by a web 87 extending inwardly from the opposite end wall 88 of the housing's base portion, whereas the bearing 86 is mounted within a side wall 89 through which the shaft 83 extends. A lock nut 91 releasably retains the bearing 86 in position and preferably a fluid-tight seal is established between the shaft 83 and the housing 11 as by means of an O ring gasket 92 seated within an annular groove 93 in the hub 94 of an arm or lever 96 which is rigidly secured to the outer end of the shaft 83, the gasket 92 being in frictional engagement with the inner annular surface of the lock nut 91 (see Figure 4).

Variable power output transmission means are provided for releasably connecting the shaft 71 to the driving gear 66 to be rotated thereby optionally in either direction. This variable power output transmission connecting means preferably takes the form of a multiple disk clutch, indicated in its entirety at 101. It will be appreciated that any suitable means which will transmit energy from the casing 26 to the power output of the servo mechanism in an amount varying in proportion to the precessional force of the casing may be utilized in place of the multiple disk friction slip clutch 101. This clutch comprises a pair of bevelled driven gears 102 and 103, and since both of these gears 102 and 103 are enmeshed with the driving gear 66, the latter also is bevelled. Being enmeshed with the driving gear 66 on opposite sides of its axis of rotation, the two gears 102 and 103 are continuously rotated thereby in opposite directions. Each of the two gears 102, 103 is provided on its inner face with a friction lining 111 and 112, respectively. A collar 113 is splined to the shaft 71 for axial sliding movement with respect thereto and for rotary movement therewith, and opposite faces of the collar 113 are provided with friction linings 116 and 117. Preferably a plurality of clutch disks 118 are interposed between the friction lining 111 on the gear 102 and the friction lining 116 on the collar; and similarly a plurality of clutch disks 119 are interposed between the friction lining 117 and the friction lining 112 on the gear 103.

Figure 2:
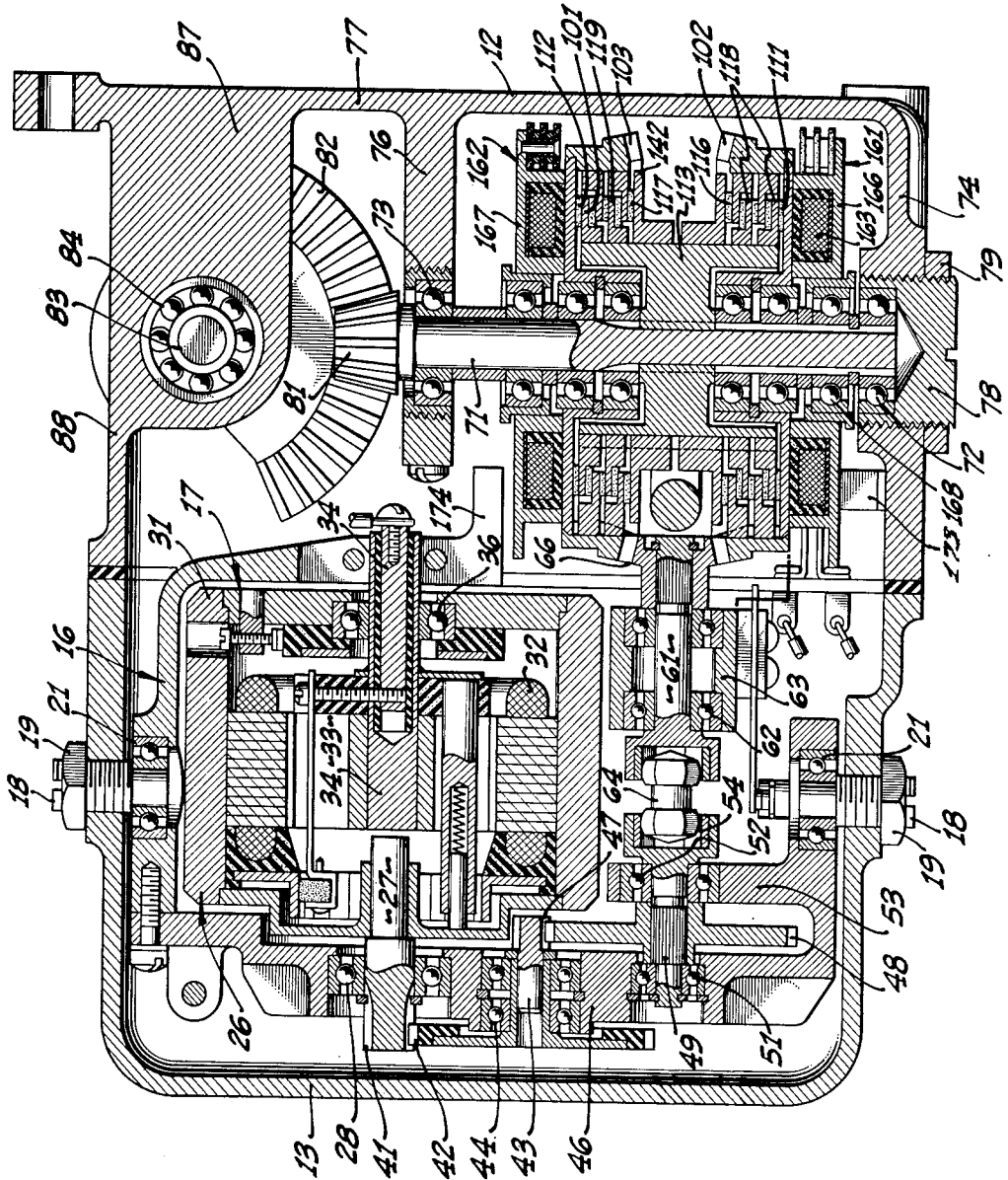
Figure 2 is a longitudinal medial section taken through the mechanism, as well as the housing, of Figure 1.

Thus it may be seen that by sliding the collar 113 upwardly, as viewed upon Figure 2, i. e., toward the gear 103, the collar will be frictionally connected to the gear 103 and thereby effect rotation of the shaft 71 in that direction in which the gear 103 is rotated by the driving gear 66. Similarly, when the collar 113 is moving downwards, as viewed upon Figure 2, i. e., toward the gear 102, the shaft 71 will be connected through the clutching mechanism to the spur gear 66 and rotated thereby in the opposite direction. Since the shaft 71 is connected to the output lever 96, it will be apparent that movement of the collar 113 in one direction causes the lever 96 to move in one direction of its movement, whereas reverse movement of the clutch collar 113 causes opposite movement of the output lever 96.

Means are provided for actuating the clutch by precessional movement of the rotor-bearing casing 16, i. e., by rotary movement of the casing 16 about the axis of the studs 18. Rigidly affixed to the extension 46 of the rotor-bearing casing 16 is an arcuate plate 126, the center of curvature of this plate 126 lying within or closely adjacent the axis of precessional movement of the casing 16. A slot 127 is formed in the plate 126, this slot extending obliquely with respect to the direction of annular movement of the plate 126 transversed by the plate when the casing swings on its axis, as is best shown in Figure 2.

A rock shaft 131 (see Figure 3) extending transversely across the housing 11 between the two spaced driven gears 102 and 103 is pivotally mounted in opposed and axially aligned bearings 132 preferably in the form of studs 133 threaded through the opposed side walls of the housing's base portion 12, each of the studs being preferably provided with a lock nut 134. A lever 136 rigid and preferably integral with the shaft 131 extends radially therefrom beyond the base portion 12 and into the cap portion 13 so that an anti-friction bearing 137 carried by the outer end of the lever 136 can be received within the inclined arcuate slot 127. The shaft 131 is also provided with preferably a pair of opposed clutch-actuating arms 138 extending radially therefrom to positions preferably on diametrically opposite sides of the clutch shaft 71 where each of the arms 138 is provided with an upwardly extending pin 139, on the inner end of which an anti-friction bearing 141 is mounted. These anti-friction bearings 141 fit nicely within an annular groove 142 in the outer peripheral surface of the clutch collar 113, as most clearly shown upon Figure 4.

Figure 8 illustrates the manner in which the presently described modification of my gyro servomotor should be mounted upon an aircraft in order to effect stabilization thereof about a particular axis. Consider, for example, that the air foil 151 of Figure 8 functions as the rudder on an airplane and hence is capable of exerting influence over the aircraft with respect to rotary movement thereof about a vertical axis, such movements commonly being known as yawing. The gyro servomotor of Figure 8, therefore, should be mounted upon the ship so that its gyroscope 17 is sensitive to yawing movements of the craft, with the result that the shaft 27 of the rotor should lie in a horizontal plane, as should also the axis of precessional movement of the rotor-bearing casing 16.

Because of the relative positioning of the various elements of the modification of my invention presently being described, this prescribed position of the gyro servomotor will cause the axis of the output shaft 83 to extend vertically and the output lever 96 to be mounted for reciprocatory rotary movement in a horizontal plane. It is easily arranged, therefore, to connect the air foil 151 to the lever 96 to be operated thereby by means of a simple link mechanism illustrated more or less diagrammatically at 152, one end of which is pivotally connected to the outer end of the lever 96 and the other end of which is connected to a lever 153 rigid with the air foil 151 and extending laterally therefrom in a horizontal direction, i. e., in a direction perpendicular to the axis about which the air foil 151 is capable of moving.

Because of the fact that the spin axis of the gyro lies in a horizontal plane, any yawing action of the craft by which it is borne will immediately cause the gyroscope to precess, such precession being made manifest by turning movement of the rotor-bearing casing about the axis of the trunnions 18, in accordance with the well-known principles of gyroscopic action.

Figure 1:
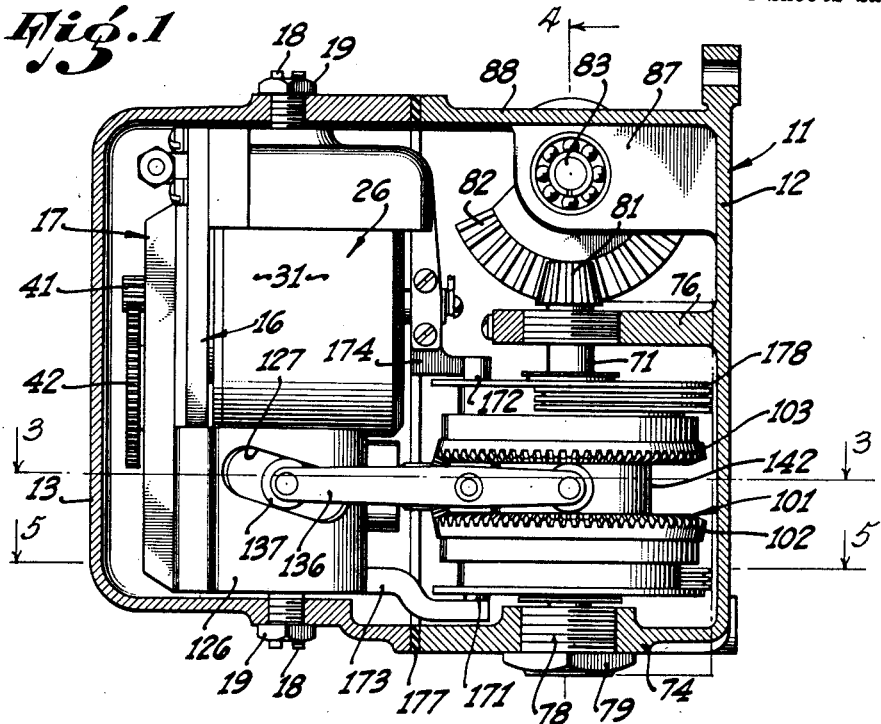
Figure 1 is a view taken in longitudinal section through the housing of a servomotor incorporating the principles of the present invention, and showing the mechanism thereinside in side elevation.

Because of the fact that the minimum possible clearance between the various friction elements of the clutch exists, coupled with the fact that all of the machine parts interposed between the rotor-bearing casing and the clutch parts, the actual angular distance through which the rotor-bearing casing turns before any further precession is limited may well be extremely small. In any event, the precessional movement of the rotor-bearing casing will be in that direction about the axis of its pivotal support which is illustrated by the direction in which the gyro's rotor is spinning and by the direction in which the yawing movement of the craft occurs. If the direction of precessional movement of the rotor-bearing casing is that which makes the slot 127 in Figure 1 move to the left, as considered in that figure, the clutch-actuating lever 136 will be swung in counter-clockwise rotation about the axis of the shaft 131 and the clutch engaging anti-friction bearing 141 will be moved upwards, as viewed on Figure 1, thereby frictionally interconnecting the clutch collar 113 with the driven gear 103 and causing the shaft 71 to rotate in the same direction. On the other hand, if the precessional movement of the rotor-bearing casing is in the opposite direction, the collar 113 will be frictionally interconnected with the opposite driven gear 102, thus causing the shaft 71 to be rotated in the opposite direction. Because of the connection of the driving, or pinion, bevel gear 66 through the speed reduction gears 41, 42, 44, and 48 and through the flexible coupling of which the element 64 is a portion, the gear 66 is continuously rotated at a rate much less than that of the gyro rotor which, because of its relatively large mass and high rate of rotation, serves as a convenient source of kinetic energy which may be drawn upon momentarily when occasion demands to keep the gear 66 rotating at no great loss in speed of the gyro rotor 26 even though called upon to perform useful work requiring a relatively great amount of energy. The output of the clutch will be a function of the precessional force of the rotor-bearing casing as applied to the clutch collar 113 since it is well known that the output of a disk type friction clutch is a function of the force with which the clutch disks are pressed together. When the clutch mechanism is engaged, the sector gear 82 with the output shaft 83 and the output lever 96 will be rotated with sufficient force to actuate the air foil 151 in that direction which will tend to retard the yawing action of the craft responsible for the precessional movement which has caused engagement of the clutch. Since this precessional movement is the result of precessional force proportional to the rate of the yawing of the craft, the output lever 96 will develop an output force also proportional to the yaw rate. This output force from the servo which is exerted by lever 96 against the air foil 151 is matched by the aerodynamic spring resistance opposing movement of the air foil 151, which resistance is a function of air speed and altitude. Since the aerodynamic effectiveness of the control surface in producing a moment about the airframe is proportional to the same function of air speed and altitude as the aerodynamic spring, the applied control servo force effects a moment upon the airframe which is independent of air speed and altitude. Thus it may be seen that the servo effects a force about the yaw axis of the craft which is proportional to yaw rate only and which force is independent of air speed and altitude. In other words, the servo exerts force outputs against the surface it controls, which forces are proportional to the rate of angular movement of the aircraft about the input axis of the rate-sensitive gyro, as a result of which the control surface is moved against an aerodynamic spring, causing the surface to be deflected through a large angle at low air speed, and through a comparatively small angle at high air speed. The damper servo of the present invention, when mounted in an aircraft, provides automatic rate control of the craft, or, in other words, proportional resisting forces on the part of the craft through its control surfaces to angular movements about the input axis of the damper servo.

Such an automatic rate control system, providing force outputs proportional to the rate of angular movement of the aircraft, has considerable application in the field of missiles and high speed aircraft, where rate gyros having a high natural frequency are essential. The natural frequency of the gyro servo in the present invention is determined by the aerodynamic spring of the air foil, and the total mass driven by the friction clutch of the servo, including the mass of the control surface. Thus it may be seen that, unlike conventional automatic rate control systems, the mass of the heavy gyro rotor does not enter directly into the determination of the natural frequency of the system. Rather, the aerodynamic spring and all driven mass following the friction clutch, including the mass of the linkages and the mass of the air foil, determine the natural frequency of the automatic rate control system of the present invention. The advantage of such a servo system is realized when the aerodynamic spring resistance of the air foil is made high. By making the output lever 96 long, the aerodynamic spring resistance will be high, with the result that the spring mass combination of the present control system will have a high natural frequency.

Since it is inevitable that the rate-sensitive servo of the present invention will have some time lag, as is the case with any servo mechanism, the servo will cause the aircraft or missile which it rate stabilizes to oscillate at some amplitude, the extent of which is a function of the time lag of the servo. Usually, by reducing the output of the rate servo, the amplitude of this oscillation can be minimized. Inasmuch as a slowing down of the gyro rotor results when the servo moves the surface it controls, the servo output is automatically reduced with the slowing down of the gyro rotor. Thus, it is apparent that should the servo cause the missile to oscillate because of inevitable time lag, the amplitude of the oscillations will diminish, with the result that a more stable condition will exist.

It becomes evident, therefore, that the gyro servomotor of the present invention will operate efficiently and with an extremely small time lag to stabilize the craft on which it is mounted when any yawing occurs. It should be made clear, however, that such stabilization does not involve maintaining the craft upon the prescribed course. It merely will retard deviation from a certain course, but is not capable of correcting deviation from a given course, i. e., is not capable of returning the craft to that course. Accordingly, in order to provide for such type of control over the craft, it is desirable, at least in some instances, to provide an auxiliary, exteriorly operated means for engaging the clutch independent of the gyro-operated clutch engaging means. In the modification presently being described, this auxiliary control takes the form of an electric clutching member associated with each of the driven gears 102 and 103, and indicated respectively at 161 and 162. In the modification here shown for illustration, each of these clutching members 161 and 162 comprises an electro-magnetic coil 163 encircling the clutch shaft 71 preferably adjacent the outer face of the associated gear 102 or 103, respectively. When an electric current is passed through the coil 163 of either of the electric clutching mechanisms 161 or 162, the coil sets up a magnetic field which attracts the associated armature which is, in the modification here being described, supplied by a portion of the associated driven gear 102 or 103, as the case might be. Hence, when so energized, either of the windings sets up a frictional drag which tends to rotate the disk 166 or 167, as the case might be, upon which the energized electromagnet is mounted because of its frictional engagement with the associated driven gear 102 or 103 developed when the two elements are attracted as the result of the action of the electromagnet. Each of the disks 166, 167 is journalled as by an anti-friction bearing 168 which freely rotates upon the shaft 71, with the result that when the electro-magnet of one of the electrical clutch mechanisms is energized, the associated disk rotates freely upon the shaft 71, the direction of rotation depending upon which of the two electro-magnets has been energized.

Each disk 166, 167 is provided with a pin 171, 172 extending outwards therefrom, each of these pins being offset from the axis of the disk, with the result that before a disk makes a complete revolution, the pin 171 or 172 will engage a finger 173, 174, respectively, each of which is rigid with and projects laterally from a portion of the rotor-bearing casing 16. Thus it may be seen that the effect of supplying electrical energy to either of the electro-magnets 163 is to rotate the associated disk 166 or 167, and through engagement of its associated pin 171 or 172, impart rotary movement to the rotor-bearing casing 16 about the axis of the trunnions 18 and thereby cause the arcuate plate 126 to move in such a manner that the clutch-actuating arm 136 is swung about the axis of its pivotal support. This effects engagement of the clutch in the same manner as when engaged by precession of the gyroscope.

Figure 5:
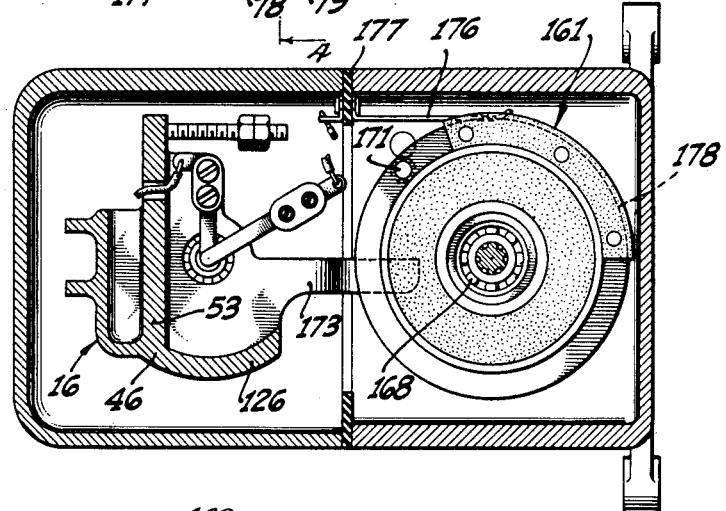
Figure 5 is a compound sectional view, the planes of section being indicated by the lines 5—5 of Figure 1, and the direction of view by the arrows.

In order to energize each of the electro-magnets 163, a pair of resilient brushes 176 (see Figure 5) are mounted upon and electrically insulated from the housing 11, preferably by being secured to the sealing gasket 177 which preferably is interposed between the two sections 12 and 13 of the housing 11 so as to aid in making it watertight. Each of the rings 166, 167 is also provided with a pair of arcuate contacts 178, each of which is engaged by one of the brushes 176, and these two contacts 178 of each electro-magnet are electrically connected by conductors (not shown) to the two terminals of the associated electro-magnet 163. As is indicated in the wiring diagram of Figure 6, one of the brushes 176 of each of the electro-magnets 163 is connected as by a conductor 179 through preferably a conventional connector 180 mounted as by screws 181 on one of the walls of the housing (see Figure 4). The terminal of the connector 180 to which the two brushes 176 of the two electro-magnets is adapted to be connected as by a conductor 182 to one of the terminals of the source of electrical energy, such as a battery 184. The other terminal 186 of the battery 184 is connected as by a conductor 187 to the movable blade 188 of a double-throw switch 189 which optionally may be brought into engagement with either of two contacts 191, 192, each of which is connected as by a conductor 193, 194 leading through the same connector 180 to the brush 176 of one of the electro-magnets 163, which brush is connected to the opposite terminal of the associated electro-magnet from that to which the conductor 179 is connected.

Here it should be explained that the double-throw switch 189 has been used merely in an exemplary sense inasmuch as it is intended here to indicate that current can be supplied from the source of electrical energy optionally to either of the electro-magnets 163. Such control can be exercised either manually or automatically, in which event the pick-off mechanism and gyroscope control apparatus disclosed in Patent No. 2,423,270, issued to me on July 1, 1947, would be entirely satisfactory. Furthermore, the functions performed by the switch 189 can also be performed by radio signal whereby remote control can be exercised over the craft upon which the gyro servomotor of the present invention is operatively mounted.

Figure 6:
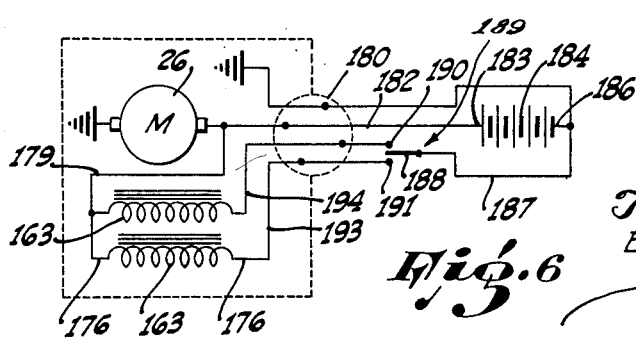
Figure 6 is a diagram illustrative of the electric circuits and connections associated with the servomotor.

Preferably the same source 184 of electrical energy is employed to energize the winding 32 of the gyro rotor 26, and the same connector 180 also serves to connect the source 184 to the winding of the rotor 26, as is clearly indicated in Figure 6.

Figure 7:
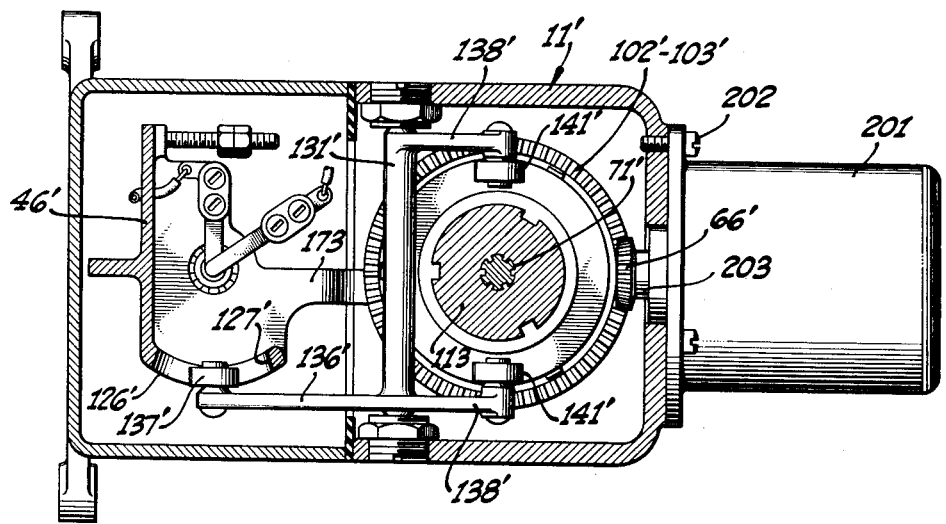
Figure 7 is a view similar to Figure 3 showing a modified form of construction.

Figure 7 illustrates a modified form of construction wherein a motor 201 separate and independent of the gyroscope is used as the means for rotating the two driven gears of the clutching mechanism. Preferably the motor 201 is mounted on the outside of the gyro rotor housing 11' as by a plurality of screws 202, the motor's shaft 203 extending through the housing so that a bevel pinion gear 66' carried by the inner end of the shaft 203 enmeshes both driven gears 102' and 103'. The clutching mechanism in this modification may be identical with that of the previously described modification and be actuated by a pair of identical anti-friction bearings 141' carried by the arms 138' of a rock shaft 131' from which a lever 136' extends into position for an anti-friction bearing 137' mounted upon its outer end to seat within an inclined slot 127' in an arcuate plate 126' which is carried by an extension 46' of the rotor-bearing casing. Accordingly, in this modification of my invention, the clutching mechanism is engaged and disengaged so as to drive the clutch shaft 71', and with it the associated output shaft and lever (not shown) optionally in either direction as the result of rotational movement of the rotor-bearing casing about the axis of its precessional movement either by gyroscopic action or by separate control, as in the case of the first described modification. However, the energy for operation of the output shaft after the clutch has been engaged is derived from a source other than the rotor of the gyroscope. This, of course, eliminates the necessity of employing the chain of reduction gears and the flexible driving connection and thereby materially simplifies the interior construction of the gyro-controlled servomotor. Consequently, in installations where the additional weight of the auxiliary motor 201 is not an important factor, this last described modification may be preferred.

I claim:

1. As a novel combination, a movable craft, means operably mounted thereon for controlling movement thereof, a gyroscope comprising a casing and a rotor journalled therein, means mounting said casing on said craft for freedom of movement about a predetermined axis of said craft perpendicular to said rotor's axis of rotation whereby said gyroscope is caused to precess about said predetermined axis when said craft develops rotational movement about an axis perpendicular to said predetermined axis, means for selectively connecting said rotor to said movement-controlling means to transmit the kinetic energy of said rotor thereto, and means operable by said precessional movement of said gyroscope to actuate said connecting means to drive said movement-controlling means by said rotor.

2. As a novel combination, a movable craft, means operably mounted thereon for controlling movement thereof, a gyroscope comprising a casing and a rotor journalled therein, means mounting said casing on said craft for freedom of movement about a predetermined axis of said craft perpendicular to said rotor's axis of rotation whereby said gyroscope is caused to precess about said predetermined axis when said craft develops rotational movement about an axis perpendicular to said predetermined axis, means for actuating said craft's movement-controlling means, and means actuated by precessional movement of said gyroscope for connecting said actuating means to said rotor to be operated thereby.

3. A gyro operated and controlled servomotor comprising a housing, a rotor-bearing casing mounted upon said housing and having a single axis of rotation, a gyro rotor journaled on said casing for rotation about an axis perpendicular to said single axis, said rotor-bearing casing being precessed about said single axis by movements of said housing about an axis perpendicular to said single axis, a control actuator movably mounted on said housing, and means actuated by said precessional movement of said rotor bearing casing for optionally connecting said control actuator to said rotor to be moved thereby or disconnecting said control actuator from said rotor.

4. A gyro operated and controlled servomotor comprising a housing, a gyro casing mounted upon said housing and having a single axis of rotation, a gyro rotor journaled on said casing for rotation about an axis perpendicular to said single axis, said gyro casing being precessed in either direction about said single axis by movements of said housing about an axis perpendicular to said single axis, means for spinning said rotor, a control actuator mounted for reciprocatory movement with respect to said housing, means optionally engageable with or disengageable from said rotor for moving said control actuator in one direction of its reciprocatory movement, means optionally engageable with or disengageable from said rotor for moving said control actuator in the other direction of its reciprocatory movement, and means operated by said casing when precessing in one direction about said single axis for disengaging a predetermined one of said actuator-moving means and engaging the other of said actuator-moving means and when precessing in the other direction about said single axis for disengaging said other of said actuator-moving means and engaging said predetermined one of said control-moving means.

5. A gyro operated and controlled servomotor comprising a housing, a rotor-bearing casing mounted therein for freedom of precessional movement in either direction about an axis of said housing, a gyro rotor revolubly mounted therein, means for spinning said rotor, a driving gear operably connected to said rotor to be rotated thereby, a pair of opposed driven gears journalled in said housing and enmeshed with said driving gear to be rotated in opposite directions thereby, a driving clutch plate rotated by each of said gears, a driven clutch plate revolubly mounted within said housing and movable optionally into engagement with either of said driving clutch plates, and means operable by said casing when precessing in one direction for moving said driven clutch plate into engagement with a predetermined one of said driving clutch plates and operable by said casing when precessing in the opposite direction for moving said driven clutch plate into engagement with the other of said driving clutch plates.

6. A gyro operated and controlled servomotor comprising a housing, a rotor-bearing casing mounted for freedom of precessional movement about an axis of said housing, a gyro rotor revolubly mounted therein, means for spinning said rotor, a driving gear operably connected to said rotor to be rotated thereby, a working shaft journalled within said housing, and clutch means for releasably connecting said working shaft to said driving gear to be rotated thereby and comprising a driving clutch plate revolubly mounted on said working shaft, a driven gear carried by said clutch plate, and enmeshed with said driving gear, a collar splined to said working shaft for rotation therewith and axial sliding movement with respect thereto, driven clutch means on a face of said collar and engageable with said driving clutch disk when said collar is moved axially theretoward, and means actuated by said casing when precessing for moving said collar axially.

7. A gyro operated and controlled servomotor comprising a housing, a rotor-bearing casing mounted for freedom of precessional movement in either direction about an axis of said housing, a gyro rotor revolubly mounted therein, means for spinning said rotor, a driving gear operably connected to said rotor to be rotated thereby, a working shaft journalled within said housing, and clutch means for releasably connecting said working shaft to said driving gear to be rotated thereby optionally in either direction and comprising a pair of opposed driving clutch plates revolubly mounted on said working shaft in spaced apart relation to each other, a driven gear carried by each of said clutch plates and enmeshed with said driving gear on opposite sides thereof whereby said driven gears are rotated thereby in opposite directions, a collar splined to said working shaft for rotation therewith and axial sliding movement with respect thereto, driven clutch means on opposite faces of said collar and engageable selectively with either of said driving clutch disks when said collar is moved axially theretoward, and means actuated by said casing when precessing in one direction for moving said collar axially in one direction and when precessing in the opposite direction for moving said collar in the opposite axial direction.

8. A gyro operated and controlled servomotor comprising a housing, a rotor-bearing casing mounted therein for freedom of precessional movement about an axis thereof, a gyro rotor revolubly mounted within said casing, an output shaft mounted within said housing for rotational movement about an axis of said housing apart from said rotor-bearing casing, reversing mechanism including a driving gear operatively associated with said output shaft for optionally turning said shaft in either direction when said driving gear is rotated, and flexible drive means connecting said driving gear to said rotor to be driven continuously thereby in all positions of precessional movement of said rotor-bearing casing about said axis of precessional movement thereof.

9. A gyro operated and controlled servomotor comprising a housing, a rotor-bearing casing mounted therein for freedom of precessional movement about an axis thereof, a gyro rotor revolubly mounted within said casing, an output shaft mounted within said housing for rotational movement about an axis of said housing apart from said rotor-bearing casing, a pair of opposed driven gears journalled on said output shaft, clutch means interposed between each of said driven gears and said output shaft whereby said output shaft can be rotated optionally by either of said gears, a driving gear journalled within said housing, said driven gears being enmeshed with said driving gear on opposite sides of the axis of rotation thereof whereby said driven gears are rotated in opposite directions by said driving gear, and flexible drive means connecting said driving gear to said rotor to be rotated continuously thereby in all positions of said casing about said axis of precessional movement thereof.

10. In combination, a rate gyroscope comprising a casing mounted for precessional movement, a source of kinetic energy, a movable power output, means including a variable output friction clutch for releasably connecting said power output to said energy source to be driven thereby, and means operated by said casing during precessional movement thereof for obtaining an output from said clutch proportional to the precessional force of said casing.

11. In combination, a rate gyroscope comprising a casing mounted for precessional movement, a source of kinetic energy, a movable power output, means including a reversing mechanism and a variable output clutch mechanism for releasably connecting said power output to said energy source to be driven thereby, and means operated by said casing during precessional movement thereof in one direction for actuating said clutch mechanism to obtain a clutch output proportional to precessional force for movement of said power output in one direction of its movement, said clutch-actuating means being operated by said casing during opposite precessional movement thereof for actuating said clutch mechanism to obtain a clutch output proportional to precessional force for movement of said power output in the other direction of its movement.

12. In combination, a rate gyroscope comprising a casing mounted for precessional movement, a source of kinetic energy, a movable power output, means including a reversing mechanism and a variable output clutch mechanism for releasably connecting said power output to said energy source to be driven thereby, means operated by said casing during precessional movement thereof in one direction for actuating said clutch mechanism to obtain a clutch output proportional to precessional force for movement of said power output in one direction of its movement, said clutch-actuating means being operated by said casing during opposite precessional movement thereof for actuating said clutch mechanism to obtain a clutch output proportional to precessional force for movement of said power output in the other direction of its movement, said clutch mechanism including means for substantially limiting precessional movement of said casing.

13. In a control device for movable craft, a rate gyro including a casing mounted upon said craft for rotation about a single axis, a gyro rotor journaled within said casing for rotation about an axis perpendicular to said single axis, said gyro being precessed about said single axis by angular movements of said craft about an axis perpendicular to both the single axis and the rotor axis, means mounted upon said craft for controlling the angular movement thereof, means for rotating said gyro rotor, means continuously driven by said rotor, and means operable upon said precession of said gyro to connect said continuously driven means to said movement controlling means in order to control the angular movement of said craft.

14. In a control device for movable craft, a rate gyro including a casing mounted upon said craft for rotation about a single axis, a gyro rotor journaled within said casing for rotation about an axis perpendicular to said single axis, said gyro being precessed about said single axis by angular movement of said craft in the gyro-sensitive plane, means mounted upon said craft for controlling the movement thereof, means for rotating said gyro rotor, a clutching means driven by said rotor and interposed between said rotor and said movement-controlling means, and clutch engaging means directly connected to said casing for actuating said clutching means upon precessional movement of said casing to drive said movement-controlling means by said rotor.

15. In combination, a rate gyroscope comprising a casing mounted on a single axis for precessional movement and a rotor revoluble within said casing on an axis perpendicular to said single axis, means for rotating said rotor, mechanism external to said gyroscope, means interposed between said rotor and said mechanism and having a driving member and a driven member, said driving member being continuously connected to said rotor and said driven member being continuously connected to said mechanism, and means operable by the precessional movement of said gyro to connect said driving member to said driven member so that the kinetic energy of said rotor can be utilized to operate said mechanism.

16. In combination, a rate gyro including a casing mounted on a single axis for precessional movement thereabout, a gyro rotor mounted on said casing with its axis perpendicular to said casing axis, a source of energy, a movable power output, a clutch mechanism comprised of a driving member and a driven member, means for continuously connecting said driving member to said energy source, means for continuously connecting said driven member to said power output, means for applying a tying force between said driving member and said driven member proportional to the precessional force exerted by said casing so that the output of said clutch will vary directly with precessional force.

17. The combination set forth in claim 16 wherein the said gyro rotor is the said energy source.

18. The combination set forth in claim 16 including means independent of the precessional force of said casing for applying a tying force between said driving member and said driven member.

19. In combination, a rate gyro including a casing mounted on a single axis for precessional movement thereabout, a gyro rotor mounted on said casing with its axis perpendicular to said casing axis, a source of energy, a movable power output, a clutch mechanism having first and second members, means for varying the contact pressure between said members, means for connecting one of said members to said energy source, means for connecting the other of said members to said power output and means for transmitting the precessional force of said casing to said pressure varying means so that said clutching mechanism develops an output proportional to precessional force.

20. The combination set forth in claim 19 wherein the said gyro rotor is the said energy source.

21. The combination set forth in claim 19 including means independent of the precessional force of said casing for applying a force to said pressure varying means.

22. As a novel combination, a movable craft, a control surface operatively mounted thereon for controlling movement thereof, a rate gyro carried by said craft including a casing mounted on a single axis for precessional movement thereabout, a gyro rotor mounted on said casing with its axis perpendicular to said casing axis, a source of energy, clutching means for selectively connecting said energy source to said control surface, means for applying a variable clutch engaging force to said clutching means to vary the output thereof in proportion to said engaging force, and means connecting said casing with said force applying means for varying said clutching means output in proportion to the precessional force of said casing.

23. As a novel combination, a movable craft, a control surfaces operatively mounted thereon for controlling movement thereof, a rate gyro carried by said craft including a casing mounted on a single axis for precessional movement thereabout, a gyro rotor mounted on said casing with its axis perpendicular to said casing axis, means for driving said gyro rotor, clutching means for selectively connecting said gyro rotor to said control surface, means for applying a variable clutch engaging force to said clutching means to vary the output thereof in proportion to said engaging force, and means connecting said casing with said force applying means for varying said clutching means output in proportion to the precessional force of said casing.

24. As a novel combination, a moveable craft, a control surface operatively mounted thereon for controlling movement thereof, a rate gyro carried by said craft including a casing mounted on a single axis for precessional movement in opposite directions thereabout, a gyro rotor mounted on said casing with its axis perpendicular to said casing axis, a source of energy, reversible clutching means for selectively connecting said energy source to said control surface to move said surface in opposite directions, means for applying a variable clutch engaging force to said clutching means to vary the output of said clutching means in either direction, and means connecting said casing with said force applying means for adjusting the said reversible clutching means output in proportion to precessional force of said casing and for determining the direction of movement of said control surface.

25. As a novel combination, the combination set forth in claim 24 including means independent of the precessional force of said casing for applying a clutch engaging force to said reversible clutching means to move said control surface in opposite directions.

26. As a novel combination, a moveable craft, a control surface mounted thereon for receiving an aerodynamic force operative to oppose angular movement of said craft, the magnitude of said force varying directly with the rate of angular movement, a rate gyro carried by said craft and having a casing mounted on a single axis for precessional movement in opposite directions, a gyro rotor mounted on said casing with its axis perpendicular to said casing axis, said gyro developing a precessional force proportional to the turning rate of said craft about the gyro sensitive plane, a source of energy, reversible clutching means for selectively connecting said energy source to said control surface to move said surface in opposite directions, means for applying a variable clutch engaging force to said clutching means for varying the output thereof in either direction, means connecting said casing and said force applying means for adjusting the said clutching means engaging force in proportion to precessional force of said casing and for determining the direction of movement of said control surface, said reversible clutching means applying to said control surface a force equal and opposite to said aerodynamic force.

27. As a novel combination, the combination set forth in claim 26 including means independent of the precessional force of said casing for applying a clutch engaging force to said reversible clutching means to move said control surface in opposite directions.

28. A gyro operated and controlled servomotor comprising a housing, a rotor-bearing casing mounted therein for freedom of precessional movement about an axis thereof, a gyro rotor revolubly mounted within said casing for spinning about an axis perpendicular to said precession axis, means for spinning said rotor, a first shaft revolubly mounted on said casing for movement therewith and having its axis of rotation parallel to said rotor spin axis and intersecting said precession axis for all positions of said casing, gearing means for connecting said rotor to said first shaft, a second shaft revolubly mounted on said housing about an axis perpendicular to and intersecting said precession axis at the point where said first shaft axis intersects said precession axis, a universal joint located at said intersecting point and connecting said first shaft to said second shaft for rotating said second shaft by said first shaft, and servomotor output means driven by said second shaft.

29. A gyro operated and controlled servomotor as defined in claim 28 including means for controlling said servomotor output by precessional movement of said rotor-bearing casing.

30. A gyro operated and controlled servomotor comprising a housing, a rotor-bearing casing mounted therein for freedom of precessional movement in either direction about an axis of said housing, a gyro rotor revolubly mounted in said casing, a source of energy, a driving gear operably connected to said source to be rotated thereby, a pair of opposed driven gears journalled in said housing and enmeshed with said driving gear to be rotated in opposite directions thereby, a driving clutch plate rotated by each of said driven gears, a driven clutch plate revolubly mounted within said housing and movable optionally into engagement with either of said driving clutch plates, and a linkage interposed between said casing and said driven clutch plate to move said driven clutch plate into engagement with one or the other of said driving clutch plates with a force proportional to the precessional force of said casing.

31. A gyro operated and controlled servomotor comprising a housing, a rotor-bearing casing mounted therein for freedom of precessional movement in either direction about an axis of said housing, a gyro rotor revolubly mounted in said casing, a source of energy, a driving gear operably connected to said source to be rotated thereby, a pair of opposed driven gears journalled in said housing and enmeshed with said driving gear to be rotated in opposite directions thereby, a driving clutch plate rotated by each of said driven gears, a driven clutch plate revolubly mounted within said housing and movable optionally into engagement with either of said driving clutch plates, and a lever pivotally mounted on said housing and having one end connected to said casing and the other end connected to said driven clutch member, said lever being moved in opposite direction by said casing upon precession of said casing in opposite directions to thereby move said driven clutch plate into engagement with one or the other of said driving clutch plates with a force proportional to the precessional force of said casing.

32. A gyro operated and controlled servomotor comprising a housing, a rotor-bearing casing mounted therein for freedom of precessional movement in either direction about an axis of said housing, a gyro rotor revolubly mounted in said casing, a source of energy, a driving gear operably connected to said source to be rotated thereby, a pair of opposed driven gears journalled in said housing and enmeshed with said driving gear to be rotated in opposite directions thereby, a driving clutch plate rotated by each of said driven gears, a driven clutch plate revolubly mounted within said housing and movable optionally into engagement with either of said driving clutch plates, a plate attached to said casing for angular movement therewith, a slot formed in said plate and extending obliquely with respect to the direction of angular movement of said plate, and a lever pivotally mounted on said housing and having one end inserted in said slot and the other end connected to said driven clutch plate, said one end being moved in opposite directions by said slot upon precession of said casing in opposite directions to thereby cause engagement of said driven clutch plate with one or the other of said driving clutch plates.

33. In combination, a rate gyro including a casing mounted on a single axis for precessional movement thereabout, a gyro rotor mounted on said casing with its axis perpendicular to the axis of said casing, a source of energy, a moveable power output, a clutching means for connecting said energy source to said moveable power output, means for applying a variable clutch engaging force to said clutching means to vary the output thereof, means connecting said casing and said force applying means for adjusting the said clutch engaging force means in proportion to the precessional force of said casing so that the output of said clutching means varies in accordance with the said precessional force of said casing.

34. In combination, a rate gyro having a casing mounted on a single axis for precessional movement thereabout and a gyro rotor mounted in said casing, a source of energy connected to said gyro rotor, a moveable power output, variable output transmission means connecting said gyro rotor to said output proportionally to the precessional force of said casing, and means connecting said casing and said variable output transmission means for varying the energy transmitted from said energy source to said moveable power output in accordance with the precessional force of said casing.

THOMAS OSMOND SUMMERS, Jr.

References Cited in the file of this patent

UNITED STATES PATENTS

| Number | Name | Date |
|---|---|---|
| 1,024,398 | Ellsworth | Apr. 23, 1912 |
| 1,422,197 | Greene | July 11, 1922 |
| 1,904,801 | Plutino | Apr. 18, 1933 |
| 2,049,120 | Imhof | July 28, 1936 |
| 2,053,182 | Crane et al. | Sept. 1, 1936 |
| 2,201,226 | Carlson | May 21, 1940 |

FOREIGN PATENTS

| Number | Country | Date |
|---|---|---|
| 407,737 | France | Jan. 7, 1910 |